United States Patent
Chowdhury et al.

(10) Patent No.: US 7,613,690 B2
(45) Date of Patent: Nov. 3, 2009

(54) REAL TIME QUERY TRENDS WITH MULTI-DOCUMENT SUMMARIZATION

(75) Inventors: Abdur R. Chowdhury, Oakton, VA (US); Gregory S. Pass, Reston, VA (US); Kush Sidhu, Rockville, MD (US); Travis Walker, Landsdowne, VA (US)

(73) Assignee: AOL LLC, Dulles, VA (US)

( * ) Notice: Subject to any disclaimer, the term of this patent is extended or adjusted under 35 U.S.C. 154(b) by 594 days.

(21) Appl. No.: 11/384,418

(22) Filed: Mar. 21, 2006

(65) Prior Publication Data

US 2007/0094247 A1 Apr. 26, 2007

Related U.S. Application Data

(60) Provisional application No. 60/728,758, filed on Oct. 21, 2005.

(51) Int. Cl.
G06F 7/00 (2006.01)
G06F 17/30 (2006.01)

(52) U.S. Cl. ................. 707/3; 707/10; 715/254
(58) Field of Classification Search ............ None
See application file for complete search history.

(56) References Cited

U.S. PATENT DOCUMENTS

| | | | |
|---|---|---|---|
| 6,859,807 B1* | 2/2005 | Knight et al. | 707/10 |
| 7,146,416 B1* | 12/2006 | Yoo et al. | 709/224 |
| 2003/0005035 A1* | 1/2003 | Rodgers | 709/202 |
| 2003/0033333 A1* | 2/2003 | Nishino et al. | 707/531 |
| 2003/0208485 A1* | 11/2003 | Castellanos | 707/5 |
| 2005/0033657 A1* | 2/2005 | Herrington et al. | 705/26 |
| 2006/0101003 A1* | 5/2006 | Carson et al. | 707/3 |
| 2006/0230021 A1* | 10/2006 | Diab et al. | 707/3 |
| 2007/0083894 A1* | 4/2007 | Gonsalves et al. | 725/46 |

OTHER PUBLICATIONS

Yahoo Buzz Index, Jan. 27, 2004, http://web.archive.org/web/20040127191005/http://buzz.yahoo.com/.*
M. Amini, "Interactive Learning for Text Summarization", Proceedings of the PKDD 2000 Workshop on Machine Learning and Textual Information Access, pp. 44-52, 2000.
C. Aone, J. Gorlinsky, B. Larsen, and M. Okurowski, "Trainable Sumarizer with Knowledge Acquired from Robust NLP Techniques", Advances in Automatic Text Summarization, MIT Press, Cambridge, MA, pp. 71-80, 1997.
R. Barzillay and M. Elhadad, "Using Lexical Chains for Text Summarization", In Proceedings of the Intelligent Scalable Text Summarization Workshop (ISTS '97), ACL, Madrid, Spain, pp. 10-17, 1997.

(Continued)

*Primary Examiner*—Isaac M Woo
*Assistant Examiner*—Shew-Fen Lin
(74) *Attorney, Agent, or Firm*—Fish & Richardson P.C.

(57) ABSTRACT

A list of "hot topics" may be provided to a user to indicate information that is currently popular. A topic may be deemed popular when a large number of search queries related to the topic are entered by users. A search system may receive and analyze an electronic source of published information to determine a reason for why a particular popular topic is popular. If content related to why a particular popular topic is popular exists in multiple electronic sources of published information, text summarization techniques may be used to determine a reason for why the popular topic is popular by from among the multiple electronic sources of published information.

17 Claims, 10 Drawing Sheets

OTHER PUBLICATIONS

S. M. Beitzel, E. Jensin, O. Freider, D.Lewis, A. Chowdhury and A. Kolcz. "Improving Automatic Query Classification via Semi-supervised Learning", Fifth IEEE International Conference on Data Mining (ICDM '05), 8 pages, 2005.

S. M. Beitzel, E. Jensin, A. Chowdhury and O. Freider, "Hourly Analysis of a Very Large Topically Categorized Web Query Log", Special Interest Group on Information Retrieval (SIGIR '04), Sheffield, South Yorkshire, UK, pp. 321-328, 2004.

T. Briscoe and J. Carroll, "Robust Accurate Statistical Annotation of General Text", Proceedings of the Third International Conference on Language Resources and Evaluation (LREC 2002), 6 pages, 2002.

J. Carbonell and J. Goldstein, "The Use of MMR, Diversity-Based Reranking for Reordering Documents and Producing Summaries", Proceedings of the 21st Annual International ACM SIGIR Conference (SIGIR '98), Melbourne, Australia, pp. 335-336, 1998.

S. Chien and N. Immorlica, "Semantic Similarity Between Search Engine Queries Using Temporal Correlation", World Wide Web Conference, Chiba, Japan, pp. 2-11, 2005.

W. Chuang and J. Yang, "Extracting Sentence Segments for Text Summarization: A Machine Learning Approach", Special Interest Group on Information Retrieval (SIGIR '00), pp. 152-159, 2000.

H. P. Edmundson, "New Methods in Automatic Extracting" Journal of the Association for Computing Machinery, vol. 16, No. 2, Apr. 1969, pp. 264-285.

E. Filatova and V. Hatzivassiloglou, "Event-Based Extractive Summarization",ACL Workshop on Summarization, Barcelona, Spain, 8 pages, 2004.

J. Goldstein, M. Kantrowitz, V. Mittal and J. Carbonell, Summarizing Text Documents: Sentence Selection and Evaluation Metrics, Special Interest Group on Information Retrieval (SIGIR '99), Berkley, CA, pp. 121-128, 1999.

D. Grossman and P. Frieder, "Information Retrieval Algorithm and Heuristics", Second Edition, Springer, Netherlands, 2004.

U. Hahn and U. Reimer, "Knowledge-Based Text Summarization: Salience and Generalization Operators for Knowledge Base Abstraction", Advances in Automatic Text Summarization, MIT Press, pp. 215-232, 1997.

K. Knight and D. Marcu, "Statistics-Based Summarization—Step One: Sentence Compression", American Association for Artificial Intelligence, 10 pages, 2000.

K. Knight and D. Marcu, "Summarization beyond sentence extraction: A probabilistic approach to sentence compression", Artificial Intelligence, pp. 91-107, 2001.

H.P. Luhn, "The Automatic Creation of Literature Abstracts", pp. 159-165, IBM Journal Apr. 1958.

D. Marcu, "From local to global coherence: A bottom-up approach to text planning", American Association for Artificial Intelligence, pp. 627-635, 1997.

K. McKeown, R. Barzilay, J. Chen, D. Elson, D Evans, J. Klavans, A Nenkova, B. Schiffman and S. Sigelman, "Columbia's Newblaster: New Features and Future Directions", Proceedings of HLT-NAACL Demonstrations, pp. 15-16, 2003.

M. Mitra, A. Singhal and C. Buckley, "Automatic Text Summarization by Paragraph Extraction", Proceedings of the ACL '97/EACL '97 Workshop on Intelligent Scalable Text Summarization, Madrid, Spain, pp. 1-11, 1997.

D. Radev, S. Blair-Goldensohn and S. Zhang, "Experiments in Single and Multi-Document Summarization Using MEAD", Proc. Document Understanding Conference, 8 pages, 2001.

D. Radev, S. Blair-Goldensohn, S. Zhang and R. Raghavan, "NewsInEssence: A System for Domain-Independent, Real-Time News Clustering and Multi-Document Summarization", Proceedings of the First International Conference on Human Language Technology Research (HLT '01), Association for Computational Linguistics, Morsistown, NJ, 4 pages, 2001.

S.E. Robertson, S. Walker and M. Beaulieu, "Experimentation as a way of life: Okapi at TREC", Information Processing and Management, 15 pages, 1999.

T. Strzalkowski, J. Wang and B. Wise, "A Robust Practical Text Summarization", Proceedings of the AAAI Intelligent Text Summarization Workshop, Stanford, CA, pp. 25-33, 1998.

L. Vanderwende, M. Banko and A. Menezes, "Event-Centric Summary Generation", Proceedings of Document Understanding Conference at HLT-NAACL, Boston, MA, 6 pages, 2004.

D. R. Radev and Weiguo Fan. Automatic Summarization Of Search Engine Hit Lists, , Hong Kong, 11 pages, Oct. 2000.

S. Outing, Poynteronline, Search Engine Rankings Point the Way, 5 pages, Nov. 23, 2005, cited at http://www.poynter.org/dg.lts/id.3785/content.content_view.htm.

Google Zeitgeist, Search patterns, trends, and surprises according to Google, 2 pages, Nov. 23, 2005, cited at http://www.google.com/press/zeitgeist.html.

Ask Jeeves Unleashes More Smart Answers, Aug. 22, 2005, 5 pages, Jan. 23, 2005, cited at http//www.blog.searchenginewatch.com/blog/0508.

A. Spink and B. J. Jansen, A Study of Web Search Trends, Webology, vol. 1, No. 2, 9 pages, Dec. 2004, Nov. 23, 2005, cited at http//www.webology.ir/2004/vln2/a4.html.

Rand Corporation, Hot Topics Selected Resources, Commentary, and Congressional Testimony, 2 pages, Nov. 23, 2005, cited at http//www.rad.org/hot_topics.

Variety.com, Get New and Reviews Delivered for Free, 3 pages, Nov. 23, 2005, cited at http://www.variety.com/index.asp?layout=rss.

Yahoo News, Ratings Box: What's Hot/What's Not, 2 pages, Nov. 23, 2005, cited at http://www.news.yahoo.com/s/mediaweek/20051119/ad_bpimw/ratingsboxwhatshotwhatsnot.

MSN Hot List, 2 pages, Nov. 23, 2005, cited at http://www.hotlist.msn.com.

Yahoo Buzz Index, Jan. 27, 2004, 2 pages, http;//web.archive.org/web/20040127191005/http://buzz.yahoo.com/.

* cited by examiner

REAL TIME QUERY TRENDS WITH MULTI-DOCUMENT SUMMARIZATION

CROSS REFERENCE TO RELATED APPLICATIONS

This application claims the benefit of U.S. Provisional Application No. 60/728,758, filed Oct. 21, 2005, and titled REAL TIME QUERY TRENDS WITH MULTI-DOCUMENT SUMMARIZATION, which is incorporated by reference in its entirety.

TECHNICAL FIELD

This description relates to search query trends.

BACKGROUND

A search query may be entered by a user who is seeking information related to a particular topic. Trends in search queries may be identified based on a change in volume of search queries related to a particular topic over a predetermined period of time.

SUMMARY

In a general aspect, a reason that a search topic is popular is identified. An indication of a search topic that is popular is received. A content feed from an electronic source of published information is analyzed to determine a reason that the search topic is popular. A user is presented with the search topic that is popular and the determined reason that the search topic is popular.

Implementations may include one or more of the following features. For example, a list of identified trend-determined reason pairs may be created by repeating the receiving and analyzing for multiple search topics.

Search popularity information that includes search topics and reasons may be accessed from a computer storage medium. A search topic may be associated with a reason for popularity of the search topic. The reason for popularity of the search topic may be determined by analyzing a content feed from an electronic source of published information.

The search popularity information also may include a category associated with a search topic. An indication of a category may be received. The search popularity information may be accessed to determine a search topic associated with the indicated category. The search topic associated with the indicated category and the at least one reason for popularity of the search topic may be presented.

Multiple search queries may be analyzed to identify a search topic that is popular. To do so, a number of search queries received during a first predetermined period of time may be determined. A number of search queries received during a second predetermined period of time may be determined. The search queries may identify a particular entity. The number of search queries received during the first and second predetermined periods of time may be compared. Based on the comparison, a determination may be made as to whether a search topic that is related to the particular entity is popular.

The content feed may be received. The content feed may include content and may be received in substantially real-time. A determination may be made as to whether the content identifies the search topic. When the content identifies the search topic, at least some of the content may be provided as the reason that the search topic is popular. The search topic that is popular may be related to a particular entity. The content of the content feed may include metadata. Determining whether the content of the content feed identifies the search topic may include determining that the content and metadata of the content feed are related to the same particular entity as the search topic.

Content of more than one content feed may be summarized when the content of more than one content feed relates to the same particular entity as the search topic. The content feeds from an electronic source of published information may include electronic data feeds, news, weblogs, or other online content. The electronic data feeds may include really simple syndication or rich site summary or resource description framework (RDF) site summary (RSS). The content feeds from an electronic source of published information may include data in the form of audio, video, text, audible text after a text-to-speech conversion, images and animation.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

Like reference symbols in the various drawings indicate like elements.

DETAILED DESCRIPTION

"Hot topics" may be provided to a user to indicate information that is currently "hot." A topic may be deemed hot when a large number of search queries related to the topic are entered by users. A hot topic also may be referred to as a topic that is popular, a trend, or an identified trend. Topics that are hot tend to ebb and flow over various time periods. Whether a topic is hot may be determined based on a change in a volume of search queries related to the topic.

For example, search queries related to a fictional character in a series of books or movies, such as Harry Potter, may have a certain baseline volume (or frequency) of search queries related to the topic of Harry Potter. However, when a news item implicates the fictional character, such as a release of the next Harry Potter movie, the volume of search queries may increase. If the increase in search query volume is above a particular threshold, the topic related to the search query, in this case, Harry Potter, may be deemed a hot topic.

Indicating that Harry Potter is a hot topic may be useful to a user in determining what other users are interested in and seeking information about. However, merely receiving an indication that a particular topic is hot may not aid a user in determining why people are suddenly interested in the topic (i.e., why the topic is hot). In other words, the user may become aware that Harry Potter is a hot topic at the moment, but the user may not be aware that the reason Harry Potter is hot right now is because the fourth installment of the Harry Potter movie series was recently released.

Techniques are described for determining the reason why a hot topic is hot. A topic may be deemed hot based on an increase in volume of search queries related to the topic. A search system may receive and analyze electronic sources of published information, referred to as articles, in the form of content feeds, to determine if an article is related to the hot topic. If so, the article, or some portion of the article, may be provided by the search system as the reason for why a hot topic is hot. If more than one article includes information related to the hot topic, text summarization techniques may be used to determine a reason for why the hot topic is hot by from among the more than one articles.

Techniques also are described for allowing a user to be presented with a particular hot topics list, such as a subject-matter hot topic list. For example, a user may select and view a celebrity hot topic list that indicates which celebrities are hot and why. Techniques also are described for allowing a user to create a customized hot topic list based on the user's preferences related to subject-matter categories (e.g., news), the use of demographic information (e.g., the user's location and age), and particular topics (e.g., Harry Potter) about which the user wishes to be notified when the particular topics are hot.

Figure 1:
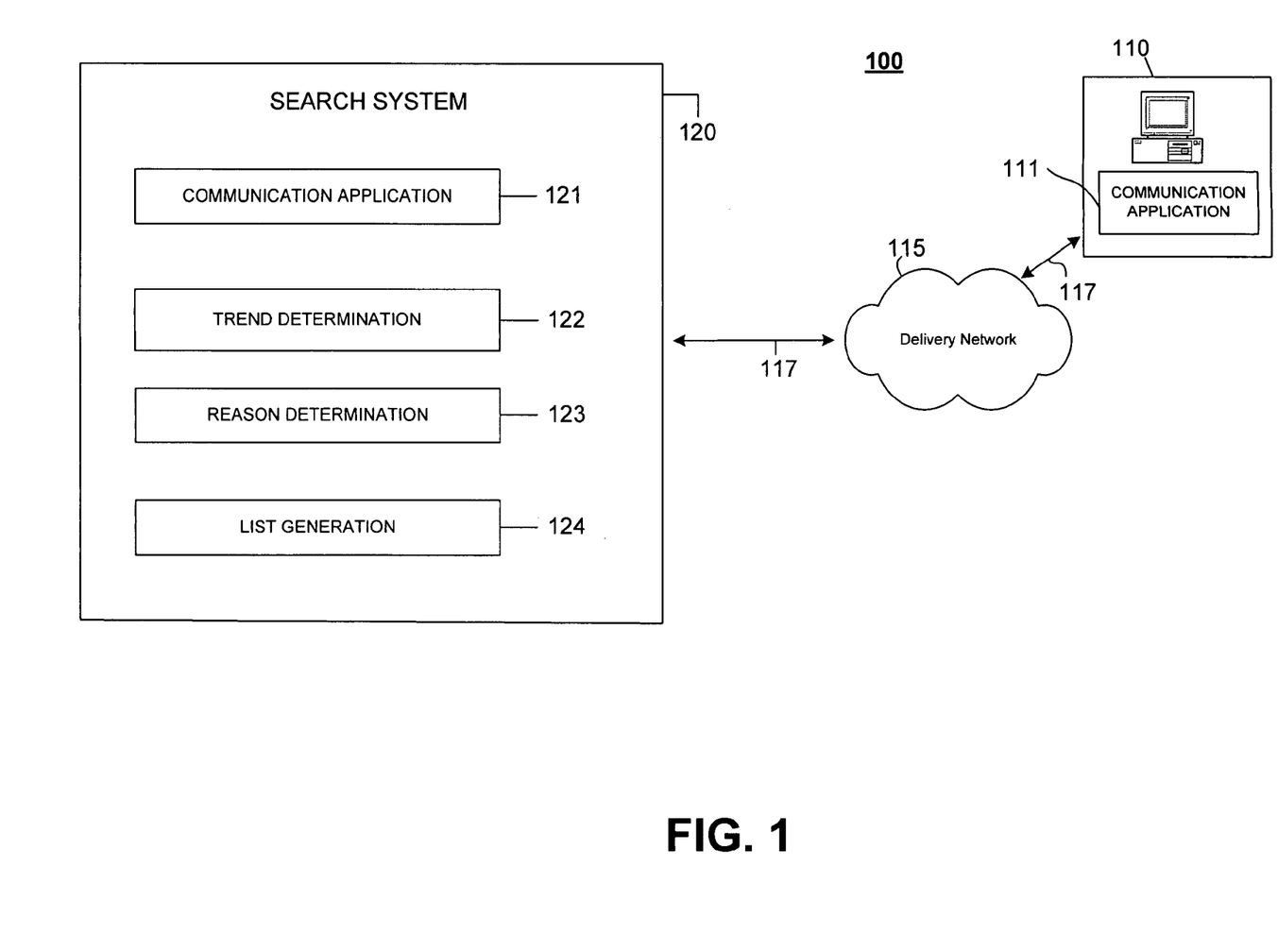
FIG. 1 is a block diagram of a communications system capable of determining and presenting a hot topic and a reason for why the topic is hot.

FIG. 1 is a block diagram 100 of a communications system capable of presenting a hot topic and a reason for why the topic is hot. More particularly, the communications system 100 is capable of delivering and exchanging messages between a client system 110 and a search system 120 through a delivery network 115 to present a list of more than one hot topic and reasons why the topics are hot based on text summarization of articles received by the search system 120.

Each of the client system 110 and the search system 120 may be a general-purpose computer (e.g., a personal computer, a desktop computer, or a laptop computer) capable of responding to and executing instructions in a defined manner. Other examples of the client system 110 and the search system 120 include a special-purpose computer, a workstation, a server, a device, a component, other physical or virtual equipment or some combination thereof capable of responding to and executing instructions. The client system 110 also may be a personal digital assistant (PDA), a communications device, such as a mobile telephone, or a mobile device that is a combination of a PDA and communications device.

The client system 110 includes a communication application 111 and is configured to use the communication application 111 to establish a communication session with the search system 120 over the delivery network 115. The communication application 111 may be, for example, a browser or another type of communication application that is capable of accessing the search system 120. In another example, the communication application 111 may be a client-side application configured to communicate with the search system 120. The client system 110 is configured to send to the search system 120 requests for a hot topic and a reason why the topic is hot. The client system 110 also is configured to receive a hot topic and a reason why the topic is hot from the search system 120 and to present the received hot topic and reason why the topic is hot to a user.

The delivery network 115 provides a direct or indirect communication link between the client system 110 and the search system 120, irrespective of physical separation. Examples of a delivery network 115 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 115 includes communication pathways 117 that enable the client system 110 and the search system 120 to communicate with the delivery network 115. Each of the communication pathways 117 may include, for example, a wired, wireless, virtual, cable or satellite communications pathway.

The search system 120 may receive instructions from, for example, a software application, a program, a piece of code, a device, a computer, a computer system, or a combination thereof, which independently or collectively direct steps, as described herein. The search system 120 includes a communication application 121 that is configured to enable the search system 120 to communicate with the client system 110 through the delivery network 115.

The search system 120 may be a host system, such as an Internet service provider that provides a search service to subscribers. In another example, the search system 120 may be a system that hosts a web site that provides search services to the general public.

In general, the search system 120 is configured to provide a hot topic and a reason why the topic is hot. More particularly, the search system 120 includes trend determination code segments 122 configured to determine, when executed, that a topic is hot. More particularly, code segments 122 may access a baseline volume of search queries related to a topic. Code segments 122 also may access information related to a current volume of search queries related to a topic. The current volume of search queries may be determined and accessed at predetermined intervals of time (e.g., hourly or bi-hourly) or upon a user request for a hot topic and a reason why the topic is hot. Code segments 122 also may be configured to determine that a topic is hot by comparing the accessed baseline volume of search queries related to the topic with the accessed current volume of search queries related to the topic. When the baseline volume and current volume differ by a particular threshold amount, code segments 122 may determine that the topic related to the search query is hot.

The search system 120 also includes reason determination code segments 123 configured to determine a reason that a particular topic is hot. More particularly, code segments 123 may be configured, when executed, to receive an article in the form of a content feed. Code segments 123 determine if the received article includes content that is similar to a search query related to a hot topic. In some implementations, an article is deemed to include content that is similar to a hot topic if the full search query (or hot topic) is present somewhere within the article. Additionally, or alternatively, an article may be deemed to include content similar to a hot topic if words or phrases similar to the fill search query are present in the article. A summary of the articles is created during execution of code segments 123 to determine a reason for why the topic is hot. If more than one article has content similar to the hot topic, a single summary may be created from the more than one articles. Code segments 123 may provide the summary of the one or more articles as a reason for why the topic is hot.

The search system also includes code segments 124 configured to generate a hot topic list including more than one hot topic and reasons why each of the listed topics is hot. More particularly, code segments 124, when executed, may cause the search system to generate a list of more than one topic that has been determined to be hot. In some implementations, a hot topic list may be organized around demographic information, such as user age range or geographic location. For example, a Washington, D.C. hot list may include topics that are hot among users who live or work in Washington, D.C. In some implementations, a hot topic list may be generated for topics within a particular category or subject matter. For example, a celebrity hot topic list may include celebrity names that are currently hot. Additionally, or alternatively, a personalized hot topic list may be generated based on user information related to a particular user, such as demographics, subject-matter preferences, and/or particular topics in which the particular user is interested. For example, a user may wish to receive a personalized hot topic list geared towards the user's age group and geographic location. This information may be provided by the user upon requesting the personalized hot topic list and/or the information may be gleaned from the user's profile. Additionally, or alternatively, a user may wish to receive a personalized hot topic list that includes particular subject matter, such as news or celebrities, as well as particular topics, such as Harry Potter. When a user indicates a particular topic in relation to a personalized hot topic list, that topic, whenever it is hot, may appear on the user's hot topic list even if it does not fall into a demographic or subject-matter category listed by the user as a criteria for generating the user's personalized hot topic list.

Data that may be accessed by any of code segments 122-124, such as search query baseline and current volumes, received articles, and user preference and profile information, may be stored in computer-readable media data stores that are associated with each of code segments 122-124. The data may be stored in persistent or non-volatile storage, though this need not necessarily be so. For example, current search query volume information may be stored only in memory, such as random access memory, of the search system. Alternatively, data, such as user preference and profile information, may be stored at client system 110 and accessed by search system 120 as needed.

Figure 2:
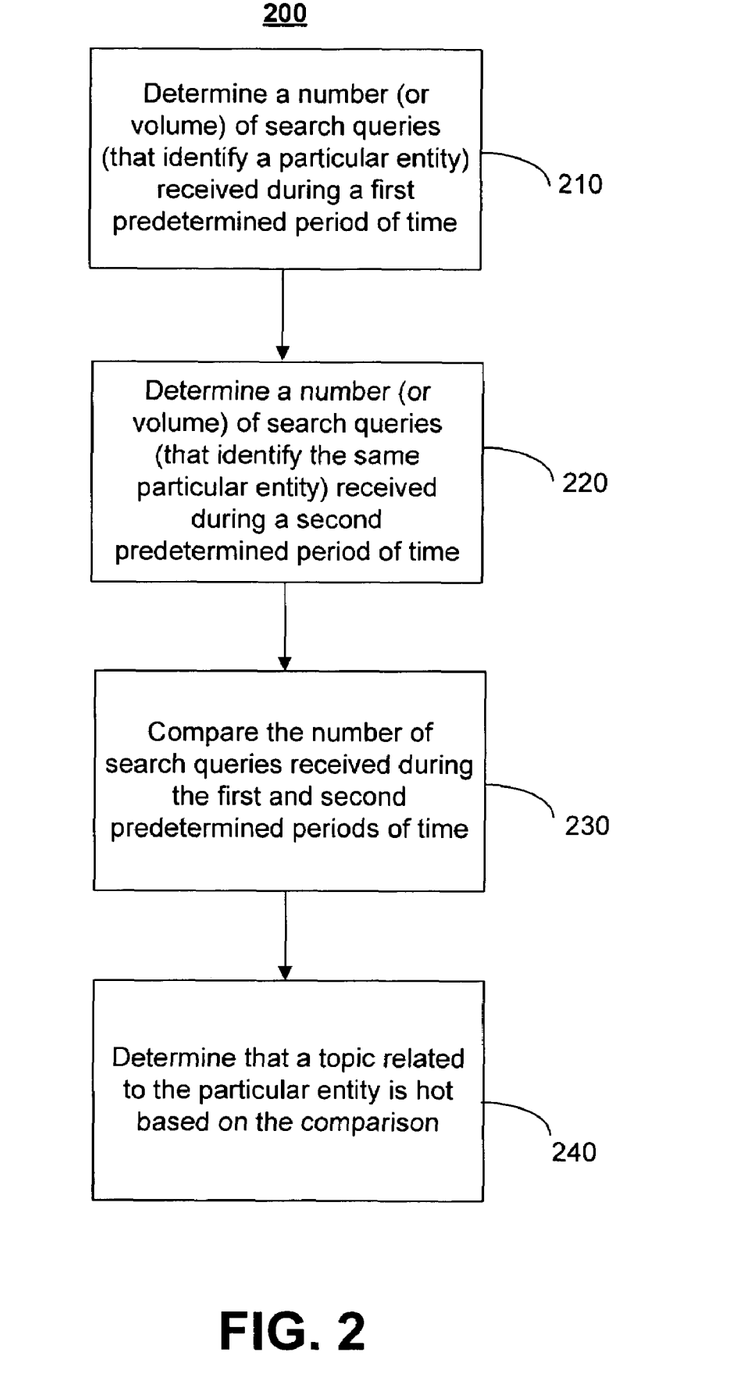
FIG. 2 is a flow chart of a process for determining that a topic is hot.

FIG. 2 is a flow chart of a process 200 for determining that a topic is hot. Process 200 may be performed by a search system, such as search system 120 of FIG. 1.

Search system 120 may determine a number of search queries received during a first predetermined time period (210). A search query is related to a particular topic, or entity. An entity refers to a particular person, place, or thing. For example, a fictional character, such as Harry Potter, or a name of a celebrity, such as Britney Spears, is an entity and a topic that may be hot. The terms "topic" and "entity" may be used interchangeably.

The number of search queries received during the first predetermined period of time may be a baseline number of search queries related to a particular topic. The number of search queries also may be referred to as a volume of search queries. In some implementations, the baseline number of search queries may be updated at certain predetermined periods of time, or upon the occurrence of an event. For example, the baseline number of search queries related to a particular topic may be determined once a week or once a month. Alternatively, or additionally, the baseline number of search queries related to a particular topic may be updated upon determining that the topic was hot and now is no longer hot. It is important to periodically update the baseline number of search queries in order to accurately determine when a particular topic is hot. For example, if a topic slowly gains in popularity, but the baseline number of search queries is not updated, the search system 120 may determine that the topic is hot for an extended period of time because the difference between the baseline number of search queries and a current number of search queries may always be large after a certain amount of gain in popularity.

Search system 120 may determine a number of search queries received during a second predetermined period of time (220). The search queries relate to the same particular entity as the search queries received during the first predetermined period of time. The number of search queries received during the second predetermined period of time may be a current volume of search queries and may or may not be the same as, or similar to, as the number of search queries received during the first predetermined period of time.

The predetermined periods of time may be a search system setting. In some implementations, a user may optionally change the predetermined time periods. For example, a search system 120 may include a predetermined period of time of an hour. However, a user may adjust the predetermined period of time to be two hours or a day.

The search system 120 may compare the number of search queries received during the first and second predetermined periods of time (230). During the comparison, the search system determines if there is a difference between the numbers of search queries received during the two predetermined periods of time and if the difference is significant. In some implementations, a negative difference (e.g., the number of search queries received during the second predetermined period of time is less than the number of search queries received during the first predetermined period of time) may cause the search system 120 to determine that there is no difference between the number of search queries received during the two predetermined periods of time.

Based on the comparison, the search system 120 may determine that a topic related to the particular entity included in the search queries is hot (240). The search system 120 may determine that a topic related to the search queries is hot if the comparison shows more than a threshold difference between the numbers of search queries received during the two predetermined periods of time. In some implementations, the amount of difference necessary for a topic to be deemed hot may differ depending on the category of the topic. For example, a small increase in a volume of search queries related to a scholarly topic may suffice for the topic to be deemed hot, while a larger increase in search query volume during the second predetermined period of time may be needed for a topic related to a celebrity to be deemed hot.

Figure 3:
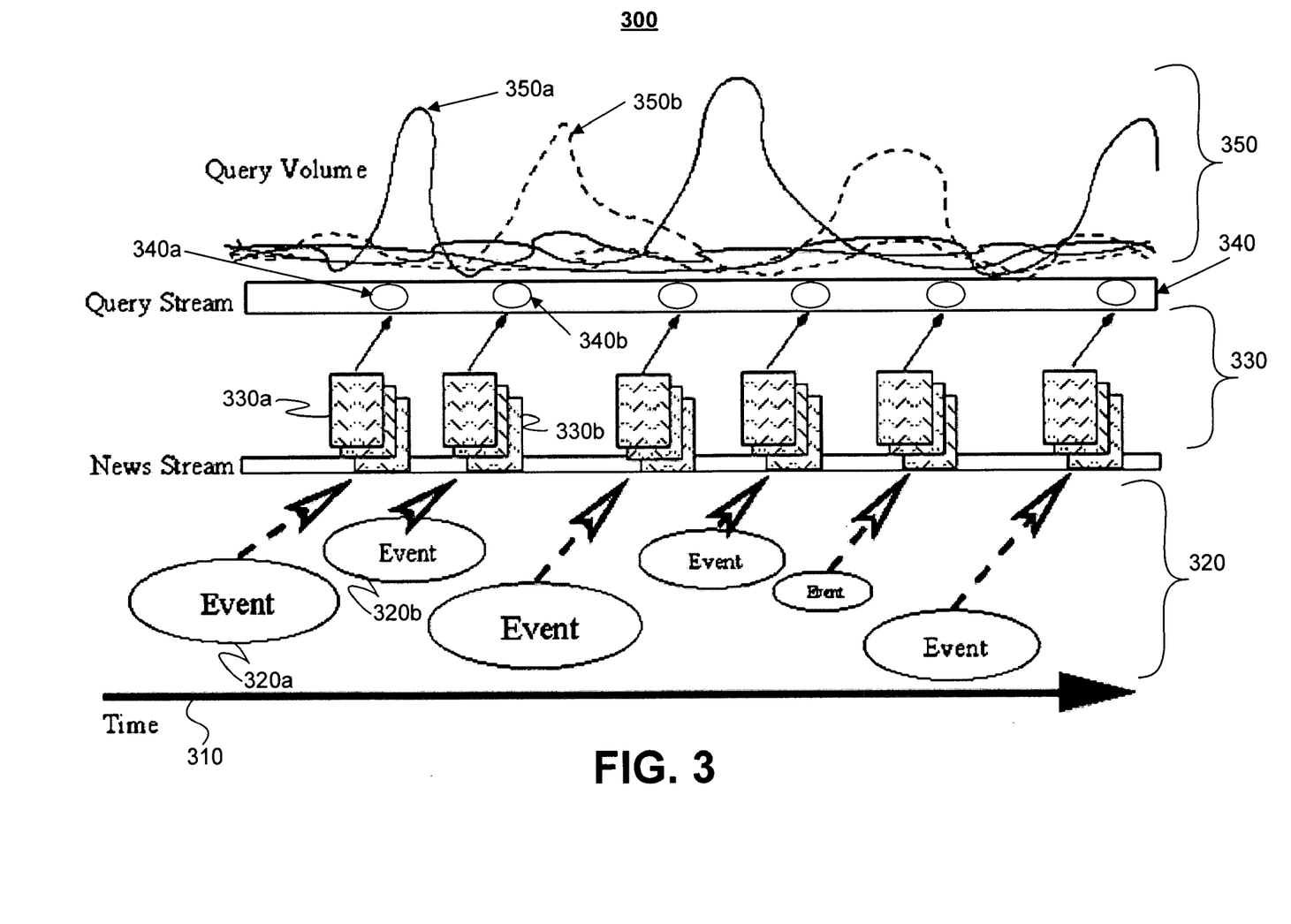
FIG. 3 is a graph depicting an event causation model of search query volume variability.

FIG. 3 is a graph 300 depicting the event causation model of search query volume variability. More particularly, graph 300 depicts how a particular event taking place in popular culture may affect a volume of search queries related to a particular topic. Graph 300 includes a timeline 310, events 320, such as events 320a and 320b, a news stream 330 including news items 330a and 330b, a query stream 340 including search queries 340a and 340b, and query volumes 350 including search query numbers 350a and 350b.

Graph 300 shows timeline 310 progressing towards the right of graph 300. Over time, various events 320, such as events 320a and 320b, occur in popular culture. For example, event 320a may represent release of the fourth Harry Potter movie and event 320b may represent Britney Spears giving birth to her son.

The events 320 are reported in the news, as depicted in news stream 330. News stream 330 includes news items (e.g., articles), such as news items 330a and 330b, which correspond to events 320, such as events 320a and 320b, respectively. For example, news item 330a may include box office figures for the Harry Potter movie and news item 330b may include the name and birthday of Britney Spears' new son.

Upon the occurrence of events 320 and the reporting of those events in news stream 330, users enter search queries related to events 320 into query stream 340. For example, search query 340a may include "Harry Potter" or "Goblet of Fire," and search query 340b may include "Britney Spears," "Britney's baby" or "Kevin Federline" (Britney's husband).

The search queries in query stream 340 are most likely not brand new search queries. For example, users have most likely searched for "Britney Spears" before she had a baby. However, when an event in popular culture introduces the public to a new phrase or person, the search query may be a brand new search query. For example, the search query "Harry Potter" probably did not appear until J. K. Rowling's first Harry Potter book was published. An increase in volume of a particular search query, such as search query 340a, in query stream 340 is represented in query volumes 350. For example, query volume 350a shows that occurrences of search query 340a (e.g., "Harry Potter") has peaked due to event 320a (e.g., release of the fourth Harry Potter movie). Similarly, query volume 350b shows that occurrences of search query 340b (e.g., "Britney's baby") has peaked due to event 320b (e.g., Britney Spears giving birth to her son). Query volume 350 also shows that after the peaks in query volume 350a and 350b, for example, the number of search queries related to events 320a and 320b, respectively, decreases.

After the peak in query volume, a new baseline number of search queries related to a particular event may be established. The new baseline number of search queries may or may not be the same as the previously determined baseline number of search queries related to the particular event.

Figure 4:
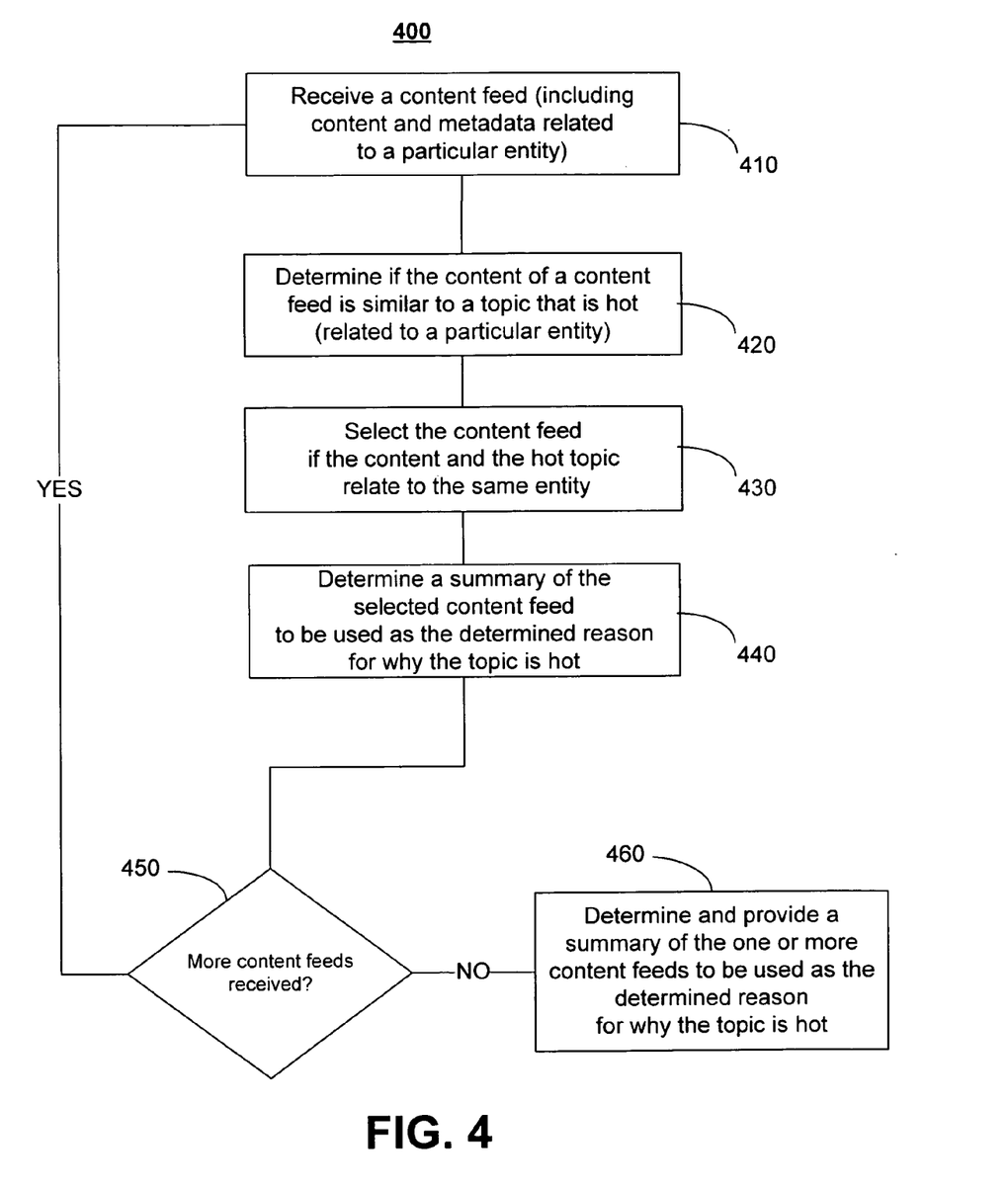
FIG. 4 is a flow chart of a process for determining and presenting a reason for why a topic is hot.

FIG. 4 is a flow chart of a process 400 for determining and presenting a reason for why a topic is hot. Process 400 may be performed by a search system, such as search system 120 of FIG. 1.

The search system 120 may receive a content feed (410). A content feed includes an article that is updated and published in substantially real-time. Examples of a content feed include electronic data feeds, such as news feeds, weblogs or any version of RSS, which typically stands for Really Simple Syndication, Rich Site Summary or RDF (Resource Description Framework) Site Summary. Content feeds may be free services provided by websites, an Internet service provider, or other information services, or may be provided on a subscription and fee basis.

A content feed includes content and metadata (e.g., content about the content). The content of a content feed may be in any electronic data format, such as audio, video, text, speech conveying text, images, and/or animation. The content and metadata are related to a particular entity. For example, the content of a content feed may relate to the success of the fourth Harry Potter movie at the box office. The metadata of the content feed may include words that appear frequently in the content of the content feed, such as "Harry Potter," "Daniel Radcliffe" (the actor who plays Harry Potter), and "J. K. Rowling." The content of a content feed may include, and may be referred to as, an article having content related to a particular topic or entity.

The search system may determine if the content of a content feed is similar to a topic that is hot (420). Content may be similar to a hot topic if one or more full search queries that are related to the hot topic exist somewhere within the content, or metadata, of the content feed. Additionally, or alternatively, if the content or metadata of the content feed includes words or phrases that are similar to the hot topic, the content may be deemed similar to the hot topic. For example, if the content of a content feed includes the phrase "Harry Potter," or if the content does not include the exact search query "Harry Potter," but instead refers to "HP" or "The Goblet of Fire," the content may be deemed similar to the hot topic.

The search system 120 may select a content feed if the content and the hot topic relate to the same entity (430). For example, for the hot topic Harry Potter, if the content of a content feed includes the search query "Harry Potter," the content feed may be selected by the search system 120. In some implementations, the search system 120 may select a content feed that is not more than a particular number of days old. A content feed that is more than a particular number of days old may be referred to as "stale." In this configuration, the time frame for when a content feed was received by the search system 120 is important in determining why a topic is hot now, as opposed to why the topic may have been hot in the past. For example, if a content feed having content related to Britney Spears is a few months old, the content may relate to the burgeoning rap career of Britney's husband, Kevin Federline. However, the reason that "Britney Spears" is a hot topic now is not because of Kevin's new single, but because of the birth of her son. Thus, it is important that the search system selects content feeds that are not stale.

The search system 120 may determine a summary of the selected content feed to be used as a determined reason for why the topic is hot (440). The search system 120 determines if more content feeds have been received (450). If yes, the search system 120 repeats the operations discussed above on the additional content feeds.

If all the content feeds have been processed, or if no further content feeds have been received by search system 120, the search system 120 determines and provides a summary of the one or more content feeds to be used as the determined reason for why the topic is hot (460). In some implementations a portion of the summary may be provided as the determined reason for why the topic is hot. For example, a summary of one or more content feeds may state that "Fourth Harry Potter movie is #1 at box office this past weekend." However, the reason why the topic "Harry Potter" is hot may be determined as a portion of the summary, such as "Movie is #1 at box office this past weekend."

In some implementations, search system 120 may receive more than one content feed at once, and may process the received content feeds in parallel, rather than serially.

The summary of multiple content feeds, to be used as a determined reason for why a topic is hot, may be determined based on any one of many multi-document or text summarization techniques. The summary may or may not be a full sentence that exists within one or more of the content feeds.

In some implementations, an information extraction approach may be used, such that the content of the content feeds may be parsed into templates, the templates may be clustered based on content, and rules may be applied to extract items of major import from the templates. The extracted items of major import may be used as, or to create, the summary of the content feeds. In some implementations, because the content of the content feeds mainly pertains to current events (and thus, are usually news documents of some sort), the summary may be created by performing the above operations on just the first two or three paragraphs of the content feeds. In some implementations, the content of the content feeds may be mined for themes, or phrases that relate to the hot topic. The themes or phrases may be added to a set where redundant themes or phrases are removed and the remaining themes or phrases are aggregated to create a summary of the content feeds.

Figure 5:
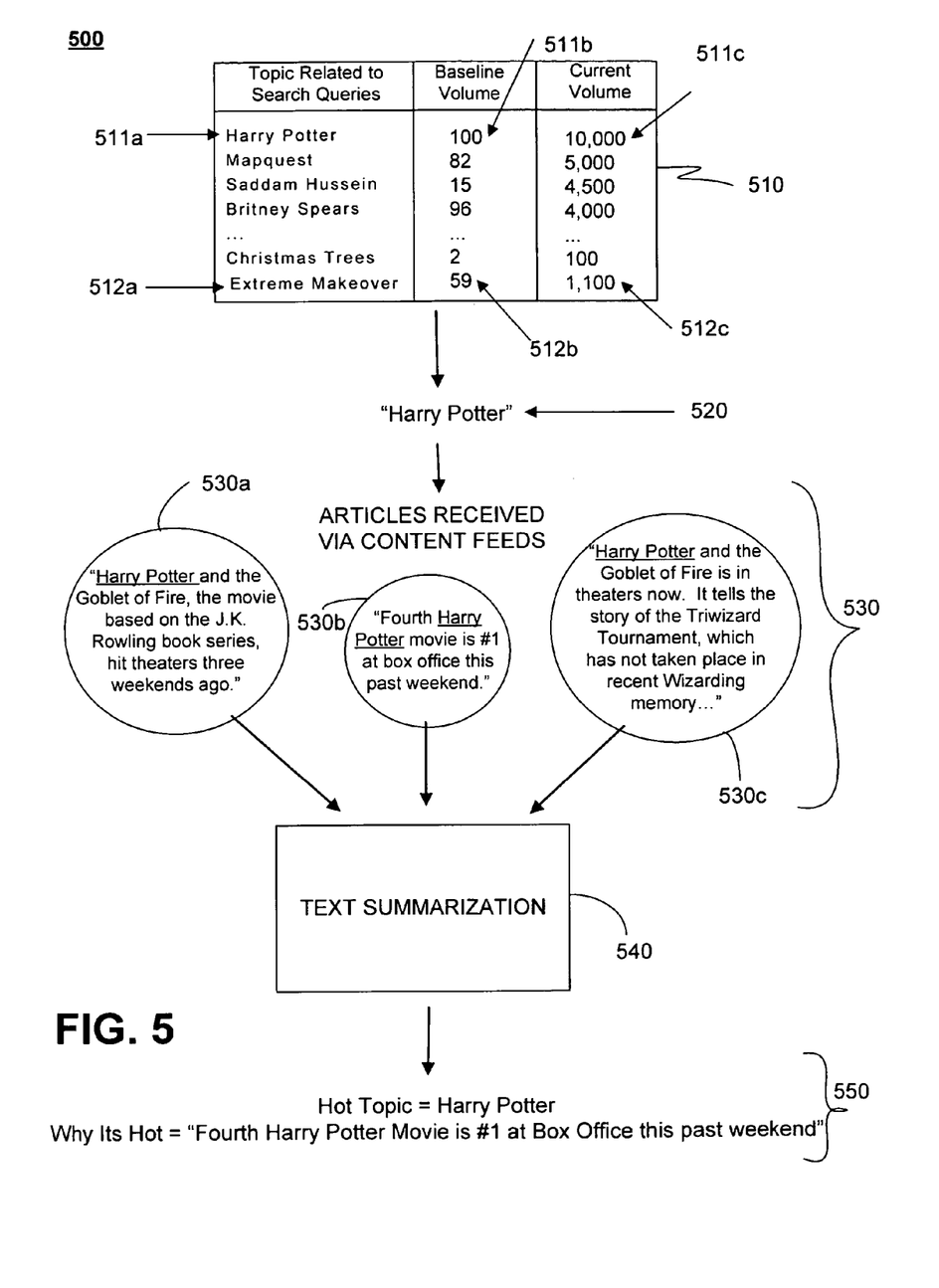
FIG. 5 is a block diagram illustrating the process for determining that a topic is hot and determining why the topic is hot.

FIG. 5 is a block diagram illustrating a process 500 for determining that a topic is hot and determining why the topic is hot. The process 500 employs a data structure 510, a hot topic 520, published information 530 including content feeds 530a-530c, a text summarization block 540 and an indication of a hot topic and why the topic is hot 550. Process 500 may be performed by a search system, such as search system 120 of FIG. 1.

Data structure 510 includes a list of topics and, for each topic, a baseline and a current volume of search queries related to the topic. For example, data structure 510 includes topic 511a, Harry Potter, and topic 512a, the television show Extreme Makeover Home Edition. Data structure 510 also includes a baseline and current volume of search queries related to each of the topics. For example, topic 511a has a baseline volume 511b of search queries related to topic 511a of 100 and a current volume 511c of search queries of 10,000. In another example, topic 512a has a baseline volume 512b of 59 and a current volume 512c of 1,100.

The search system 120 may determine that topic 511a is a hot topic because the difference between the current volume of search queries related to topic 511a and the baseline volume of search queries related to topic 511a is more than a threshold amount. More particularly, in this case, the current volume of search queries is 100 times the baseline volume of search queries. Thus, hot topic 520, "Harry Potter" is provided based on the comparison of the current and baseline volumes of search queries related to the topic.

The hot topic 520 is compared with content of at least one of content feeds 530 received by the search system. For example, the search system 120 may receive content feeds 530a-530c. Content feeds 530a-530c include the shown content (e.g., an article) metadata (not shown). In this example, content feed 530a may be a news article from a website, such as CNN.com, content feed 530b may be a blog entry or "article," and content feed 530c may be an article provided by an entertainment news subscription service.

Search system 120, which may implement the process 500, may determine if the content of content feeds 530 is similar to the hot topic 520. As shown in FIG. 5, the content of each of content feeds 530a-530c includes the full search query "Harry Potter." Thus, content feeds 530a-530c are selected by search system 120 and provided to text summarization unit 540.

Text summarization unit 540 summarizes the content of content feeds 530a-530c to determine and provide a reason for why the hot topic 540 is hot in a manner similar to that described above.

Text summarization unit 540 provides the search system 120 with an indication of the hot topic 540 and the reason why hot topic 520 is hot. In the present example, text summarization unit 540 determines that the content feeds 530 may be summarized as "Fourth Harry Potter movie is #1 at box office this past weekend" and, thus, may provide this summary as the reason 550 for why the hot topic 520 is hot.

Figure 6:
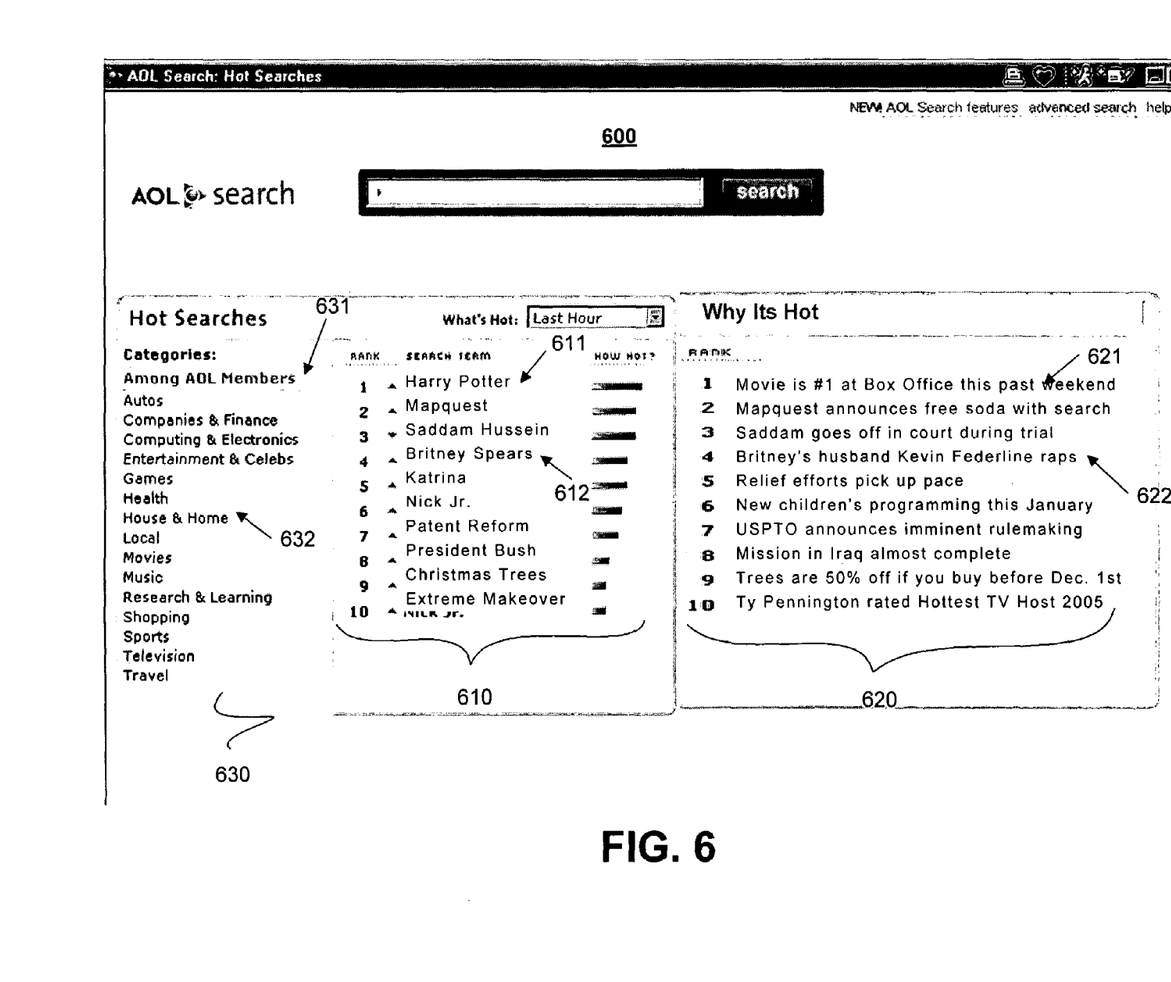
FIG. 6 is an illustration of an exemplary user interface for presenting a list of hot topics and reasons why the topics are hot.

FIG. 6 is an illustration of an exemplary user interface 600 for presenting a list of hot topics and reasons why the topics are hot. User interface 600 includes hot topics 610, such as hot topics 611 and 612, reasons why the topics are hot 620, such as reasons 621 and 622, and links for hot lists related to particular categories 630, such as links for subject-matter hot lists 631 and 632.

Hot topics 610 includes a list of topics that are determined to be hot based on a difference between a current and baseline volume of search queries related to the topics. Reasons why the topics are hot 620 include a sentence that provides a reason for why each hot topic is hot. Each reason 620 is the summary created and provided from the received articles determined to have content similar to the corresponding topic 610. As mentioned above, the reason may be the entire summary or, in some implementations, the reason may include just a portion of the summary.

For example, hot topic 611 "Harry Potter" is hot because "Movie is #1 at box office this past weekend." In another example, hot topic 612 "Britney Spears" is hot because "Britney's husband Kevin Federline raps."

The hot topics 610 are topics that are hot among all members of an Internet service provider, such as America Online. Search system 120 may receive a user identity, as well as the user's demographic or profile information, for a user who requests information on a topic via entering a search query related to the topic. In this configuration, search system 120 may determine which topics are hot among particular people, such as people known to a particular user (e.g., a user's buddies), people belonging to a certain age range or geographic location, or members of an Internet service provider or the general public. User interface 600 indicates that hot topics 610 are the topics that are hot among AOL members by highlighting hot topic link "Among AOL Members" 631.

Hot topic lists also may exist for particular subject-matter categories of information. A user may select a subject-matter hot topic list by selecting one of hyperlinks 630, such as hyperlink 632. By selecting hyperlink 632, a user may be presented with a hot topic list for topics in the "House & Home" category. In this manner, a user may easily switch between general and subject-matter hot topic lists.

Figure 7:
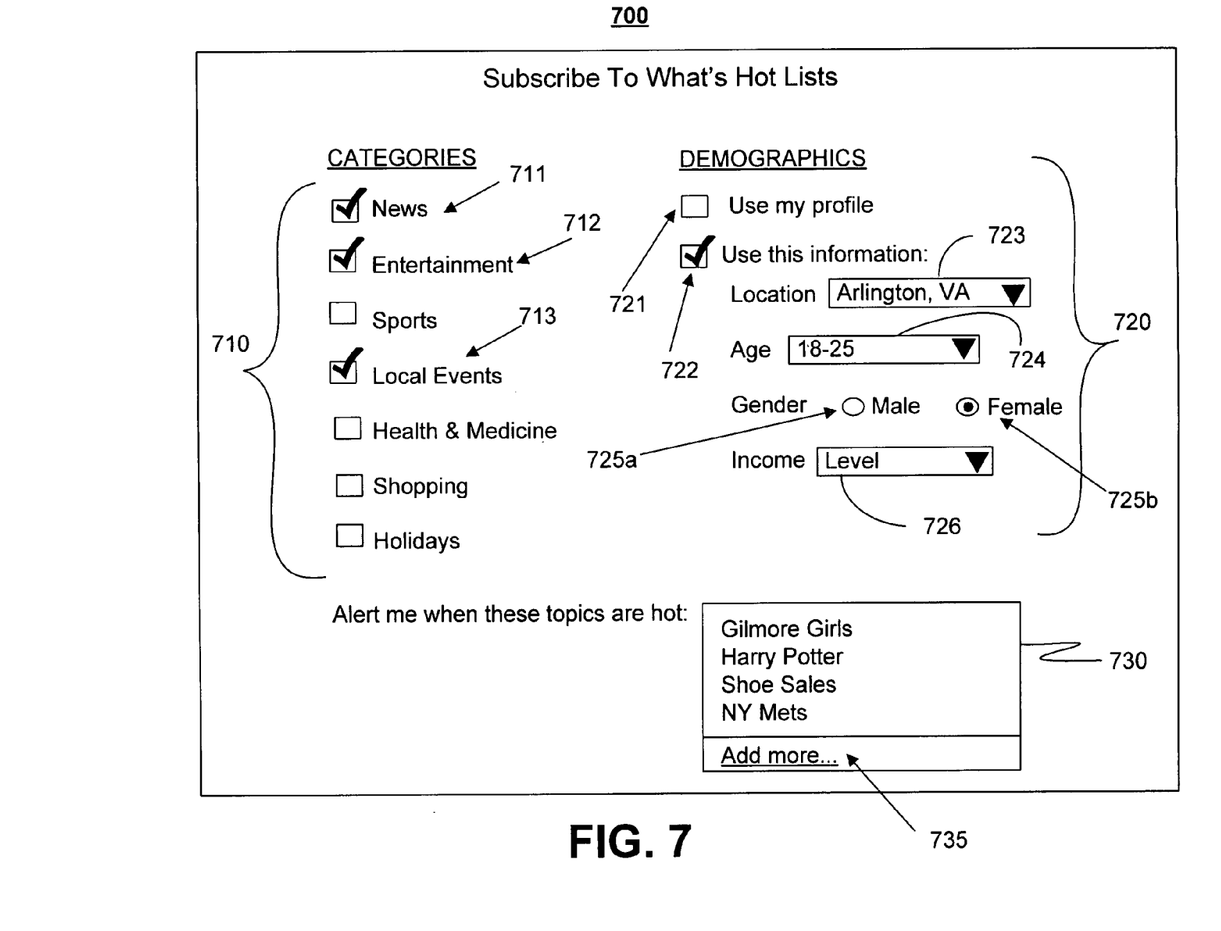
FIG. 7 is an illustration of a user interface for allowing a user to subscribe to, and create, a personalized hot topic list.

FIG. 7 is an illustration of a user interface 700 for allowing a user to subscribe to, and create, a personalized hot topic list. Rather than viewing a hot topic list for a predetermined subject, as described above, a user may create a personalized hot topic list that includes categories 710 that interest the user, demographic information 720 that a user wishes to influence the hot topics provided, and particular topics 730 a user may specify to be included in a hot topic list even if the topics do not fall within a category or demographic criteria indicated by the user.

For example, a user has selected three categories (e.g., news 711, entertainment 712 and local events 713) from which hot topics may be included in the user's personalized hot topic list. The user also has indicated that specific demographic information may influence the determination of hot topics by selecting checkbox 722. More particularly, the user has indicated a location 723 of Arlington, Va, an age range 724 of 18-25 and a gender of female by selecting radio button 725b (radio button 725a may be selected to indicate that the user is a male). The user has chosen not to include income information 726. Rather than providing specific demographic information as described, a user may select checkbox 721 to indicate that the user's profile information may be used to influence hot topic selection.

The user also has indicated a list of particular topics that should be included in the user's personalized hot topic list, if the topics are hot, even if the topics would not otherwise be presented to the user based on the other criteria indicated in user interface 700. Particular topics 730, including "Gilmore Girls," for example, have already been provided by the user. The user may add more particular topics by clicking on hyperlink 735.

Figure 8:
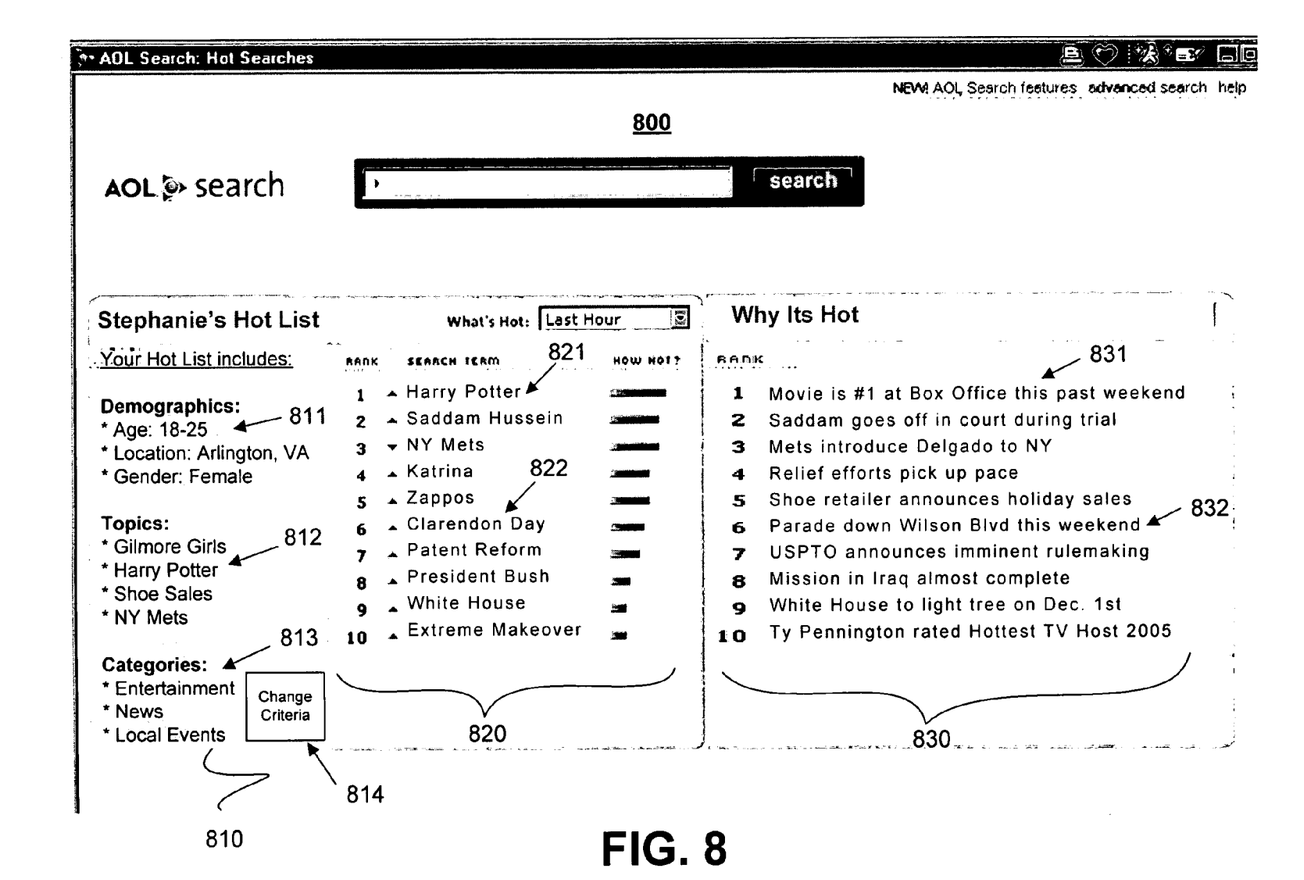
FIG. 8 is an illustration of an exemplary user interface for a personalized hot topic list.

FIG. 8 is an illustration of an exemplary user interface 800 for a personalized hot topic list. User interface 800 includes hot topic list user criteria 810, hot topics 820 and reasons why the topics are hot 830.

User interface 800 is a personalized hot topic list for user "Stephanie." User Stephanie has used user interface 700 of FIG. 7 to provide hot topic list criteria that appears in user interface 800 as user criteria 810. For example, the user has indicated demographics information 811, particular topics 812 and categories 813. The user may change the user criteria by selecting a "Change Criteria" button 814. Selecting button 814 may cause user interface 700 to be presented to the user, allowing the user to edit, add or delete criteria.

Hot topics 820, and the associated reasons why the topics are hot 830, correspond to the user criteria 810. For example, topic 821 ("Harry Potter") is included in the hot topic list because it is a particular topic indicated by the user to be included in the user's personalized hot topic list. However, because the user selected the entertainment category, "Harry Potter" may have been included in hot topic list 800 even absent the explicit inclusion of this particular topic in the user criteria. In another example, topic 822 ("Clarendon Day") is news of a local event, and is included in the hot topic list because the user indicated a preference for hot topics in the local events category and provided the user's geographic location to permit the search system 120 to determine which events are "local" to the user.

It is to be understood that a topic must be hot for it to be included in a user's personalized hot topic list. Indicating a preference for a particular category or topic may not cause the topics in the category, or a particular topic, to automatically be included in the personalized hot topic list unless the topic also happens to be deemed hot using the methods described previously.

Figure 9:
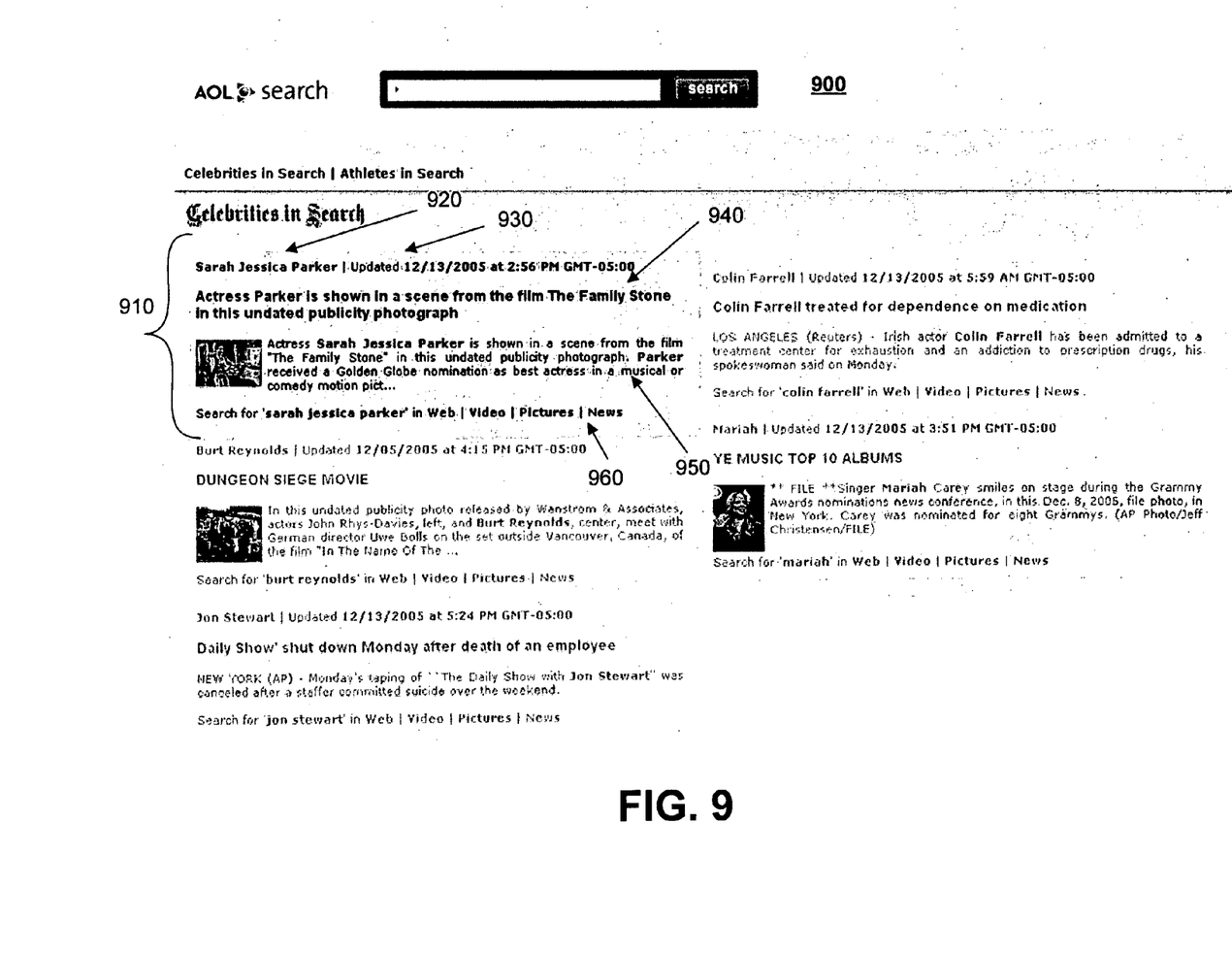
FIGS. 9 and 10 are illustrations of exemplary user interfaces for providing hot topics in a particular subject-matter category.
Figure 10:
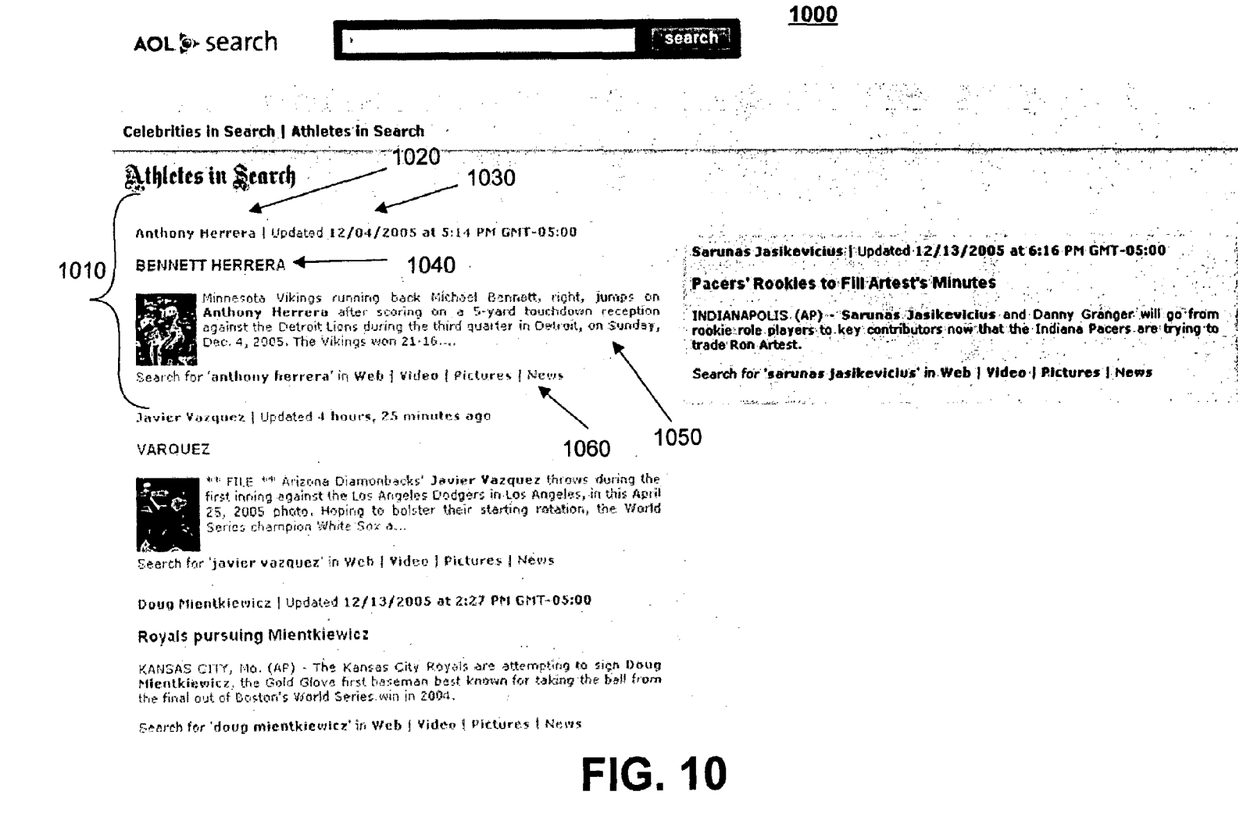

FIGS. 9 and 10 are illustrations of exemplary user interfaces 900 and 1000, respectively, for providing hot topics in a particular category. More particularly, user interface 900 is a celebrity hot topic list and user interface 1000 is a sports hot topic list.

User interface 900 includes hot topic sub-window 910 related to hot topic 920 Sarah Jessica Parker. The reason why topic 920 is hot is indicated as being updated 930 on December 13th at 2:56 PM. The reason why topic 920 is hot is presented as a single sentence (e.g., a sentence that represents a summary of the articles related to the search query) 940 indicating that "Parker is shown in a scene from the film The Family Stone." A user may receive more information about why topic 920 is hot from information 950. Information 950 includes a photograph and may be an article of one of the content feeds received by the search system and used to determine the single sentence reason 940. The user may click on a hyperlink (not shown) to view the rest of this, or other articles, related to hot topic 920 that may or may not have been used in determining why hot topic 920 is hot. The user also may search for further information related to Sarah Jessica Parker by clicking on navigation bar 960.

User interface 1000 includes hot topic sub-window 1010 related to hot topic 1020 Anthony Herrera. The reason why topic 1020 is hot is indicated as being updated 1030 on December 4th at 5:14 PM. The reason why topic 1020 is hot is presented as a single sentence (e.g., a sentence that represents a summary of the articles related to the search query) 1040 indicating "Bennett-Herrera" which relates to a fight between the two football players. A user may receive more information about why topic 1020 is hot from information 1050. Information 1050 includes a photograph and may be an article of one of the content feeds received by the search system and used to determine the single sentence reason 1040. The user may click on a hyperlink (not shown) to view the rest of this, or other articles, related to hot topic 1020 that may or may not have been used in determining why hot topic 1020 is hot. The user also may search for further information related to Anthony Herrera by clicking on navigation bar 1060.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method, performed at least in part by a computer, for identifying a reason that a search topic is popular, the method comprising:
    receiving an indication of a search topic that is popular, the search topic that is popular being related to a particular entity;
    in response to receiving the indication of the search topic that is popular, identifying a content feed from an electronic source of published information that includes content published less than a threshold period of time prior to the search topic becoming popular, the content of the content feed including metadata;

determining whether the content, of the identified content feed, published less than the threshold period of time prior to the search topic becoming popular is relevant to the search topic;

in response to a determination that the content, of the identified content feed, published less than the threshold period of time prior to the search topic becoming popular is relevant to the search topic:

analyzing the content, of the identified content feed, published less than the threshold period of time prior to the search topic becoming popular, analyzing the content comprising determining that the content and metadata of the content feed are related to the same particular entity as the search topic;

determining a reason that the search topic is popular based on the analysis, determining the reason comprising, when the content identifies the search topic, providing at least some of the content as the reason that the search topic is popular; and presenting to a user the search topic that is popular and the determined reason that the search topic is popular; and summarizing content of more than one content feed when the content of more than one content feed relates to the same particular entity as the search topic.

2. The method of claim 1 further comprising creating a list of identified trend-determined reason pairs by repeating the receiving and analyzing for multiple search topics.

3. The method of claim 1 further comprising accessing search popularity information stored in a computer storage medium that includes search topics and reasons, wherein:

a search topic is associated with at least one reason for popularity of the search topic, and the at least one reason for popularity of the search topic is determined by analyzing at least one content feed from an electronic source of published information.

4. The method of claim 3 wherein the search popularity information also includes a category associated with a search topic, the method further comprising:

receiving an indication of a category;

accessing the search popularity information to determine a search topic associated with the indicated category; and presenting the search topic associated with the indicated category and the at least one reason for popularity of the search topic.

5. The method of claim 1 further comprising analyzing multiple search queries to identify a search topic that is popular.

6. The method of claim 5 wherein analyzing multiple search queries to identify a search topic that is popular comprises:

determining a number of search queries received during a first predetermined period of time, the search queries identifying a particular entity;

determining a number of search queries received during a second predetermined period of time, the search queries identifying the particular entity;

comparing the number of search queries received during the first and second predetermined periods of time; and based on the comparison, determining whether a search topic related to the particular entity is popular.

7. The method of claim 1 wherein the content feed from an electronic source of published information includes at least one of electronic data feeds, news, weblogs, or other online content.

8. The method of claim 7 wherein the electronic data feeds include RSS.

9. The method of claim 1 wherein the content feed from an electronic source of published information includes data in the form of at least one of audio, video, text, audible text after a text-to-speech conversion, images and animation.

10. The method of claim 1 wherein identifying a content feed from an electronic source of published information that includes content published less than a threshold period of time prior to the search topic becoming popular comprises identifying a content feed from an electronic source of published information that includes content published less than a threshold number of days prior to the search topic becoming popular.

11. The method of claim 1 wherein presenting to a user the search topic that is popular and the determined reason that the search topic is popular comprises presenting, with the search topic that is popular and the determined reason that the search topic is popular, an indication of a time when the reason was determined.

12. The method of claim 1 wherein the search topic that is popular is a first search topic, the determined reason that the search topic is popular is a first reason, the indication of a time when the reason was determined is a first indication, and presenting, with the search topic that is popular and the determined reason that the search topic is popular, an indication of a time when the reason was determined comprises:

presenting to the user the first search topic that is popular, the first reason that the first search topic is popular, and the first indication of a time when the first reason was determined, the first indication of a time when the first reason was determined including a date and a time of day when the first reason was determined; and presenting, currently with the first search topic, the first reason, and the first indication, to the user a second search topic that is popular, a second reason that the second search topic is popular, and a second indication of a time when the second reason was determined, the second indication of a time when the second reason was determined including a date and a time of day when the second reason was determined, wherein the second search topic is different than the first search topic, the second reason is different than the first reason, and the second indication is different than the first indication.

13. The method of claim 1 wherein determining the reason that the search topic is popular comprises excluding, from the determination, content published more than a threshold period of time prior to the search topic becoming popular and excluding, from the determination, content that is not relevant to the search topic.

14. The method of claim 1 wherein determining the reason that the search topic is popular comprises determining the reason that the search topic is popular based only on content published less than the threshold period of time prior to the search topic becoming popular.

15. The method of claim 1 wherein:

identifying a content feed from an electronic source of published information that includes content published less than a threshold period of time prior to the search topic becoming popular comprises:

receiving multiple content feeds, and selecting a subset of the multiple content feeds that each include content that was published less than a threshold period of time prior to the search topic becoming popular and that is relevant to the search topic, the selected subset of content feeds being less than all of the multiple content feeds; and analyzing the content, of the identified content feed, published less than the threshold period of time prior to the search topic becoming popular comprises analyzing content from each of the selected subset of content feeds.

16. At least one computer-readable storage medium encoded with executable instructions that, when executed by at least one processor, cause the at least one processor to perform operations comprising:

receiving an indication of a search topic that is popular, the search topic that is popular being related to a particular entity;

in response to receiving the indication of the search topic that is popular, identifying a content feed from an electronic source of published information that includes content published less than a threshold period of time prior to the search topic becoming popular, the content of the content feed including metadata;

determining whether the content, of the identified content feed, published less than the threshold period of time prior to the search topic becoming popular is relevant to the search topic;

in response to a determination that the content, of the identified content feed, published less than the threshold period of time prior to the search topic becoming popular is relevant to the search topic:

analyzing the content, of the identified content feed, published less than the threshold period of time prior to the search topic becoming popular, analyzing the content comprising determining that the content and metadata of the content feed are related to the same particular entity as the search topic;

determining a reason that the search topic is popular based on the analysis, determining the reason comprising, when the content identifies the search topic, providing at least some of the content as the reason that the search topic is popular; and presenting to a user the search topic that is popular and the determined reason that the search topic is popular; and summarizing content of more than one content feed when the content of more than one content feed relates to the same particular entity as the search topic.

17. A system comprising:

at least one computer; and at least one computer-readable storage medium coupled to the at least one computer having instructions stored thereon which, when executed by the at least one computer, causes the at least one computer to perform operations comprising:

receiving an indication of a search topic that is popular, the search topic that is popular being related to a particular entity;

in response to receiving the indication of the search topic that is popular, identifying a content feed from an electronic source of published information that includes content published less than a threshold period of time prior to the search topic becoming popular, the content of the content feed including metadata;

determining whether the content, of the identified content feed, published less than the threshold period of time prior to the search topic becoming popular is relevant to the search topic;

in response to a determination that the content, of the identified content feed, published less than the threshold period of time prior to the search topic becoming popular is relevant to the search topic:

analyzing the content, of the identified content feed, published less than the threshold period of time prior to the search topic becoming popular, analyzing the content comprising determining that the content and metadata of the content feed are related to the same particular entity as the search topic;

determining a reason that the search topic is popular based on the analysis, determining the reason comprising, when the content identifies the search topic, providing at least some of the content as the reason that the search topic is popular; and presenting to a user the search topic that is popular and the determined reason that the search topic is popular; and summarizing content of more than one content feed when the content of more than one content feed relates to the same particular entity as the search topic.

* * * * *